United States Patent [19]  [11]  4,265,016
Ducret  [45]  May 5, 1981

[54] CABLE SPLITTER

[76] Inventor: Lucien C. Ducret, 8 Apache Pl., Riverside, Conn. 06878

[21] Appl. No.: 61,264

[22] Filed: Jul. 27, 1979

Related U.S. Application Data

[63] Continuation-in-part of Ser. No. 909,124, May 24, 1978.

[51] Int. Cl.³ .......................................... B21F 13/00
[52] U.S. Cl. ..................................... 30/90.8; 30/90.4; 30/304
[58] Field of Search ...................... 30/90.8, 90.9, 90.4, 30/304

[56] References Cited

U.S. PATENT DOCUMENTS

| 2,621,659 | 12/1952 | Greene | 30/90.4 |
|---|---|---|---|
| 2,643,561 | 6/1953 | Ackley | 30/90.1 |
| 2,662,283 | 12/1953 | Gienger | 30/90.8 |
| 2,731,970 | 1/1956 | Hughes | 30/90.4 |
| 2,943,391 | 7/1960 | Shannon | 30/90.8 |
| 3,238,618 | 3/1966 | Cook | 30/90.4 |
| 3,279,058 | 10/1966 | Dibble | 30/90.8 |
| 3,600,805 | 8/1971 | Stuckel | 30/90.9 |
| 3,750,281 | 8/1973 | Belling | 30/90.8 |
| 4,026,017 | 5/1977 | Arnold | 30/90.6 |
| 4,133,109 | 1/1979 | Dow | 30/90.4 |

FOREIGN PATENT DOCUMENTS

| 15211 | 10/1897 | Switzerland | 30/304 |
|---|---|---|---|
| 704488 | 2/1954 | United Kingdom | 30/90.4 |

Primary Examiner—Othell M. Simpson
Assistant Examiner—J. T. Zatarga
Attorney, Agent, or Firm—DeLio and Montgomery

[57] ABSTRACT

A hand tool for slitting the sheath on flat, two to four conductor, plastic clad cables wherein one or more pointed knives project from the end of a handle into a chamber bounded, opposite the knife blades, by a sloping wall, one end of which defines an opening only slightly larger than the cable to be cut while the other end of the wall defines one end of an elongated opening throughout which the cable can be moved to assume a range of angles relative to the knives. A cable to be cut may be introduced into the chamber at an angle such that its surface does not touch the knives, and the tool can then be moved to an angle such that the knife points are driven into the cable and the sheath is cut, to facilitate separation and stripping of the conductors.

6 Claims, 17 Drawing Figures

FIG. 1
FIG. 2
FIG. 3
FIG. 4
FIG. 5
FIG. 6
FIG. 7
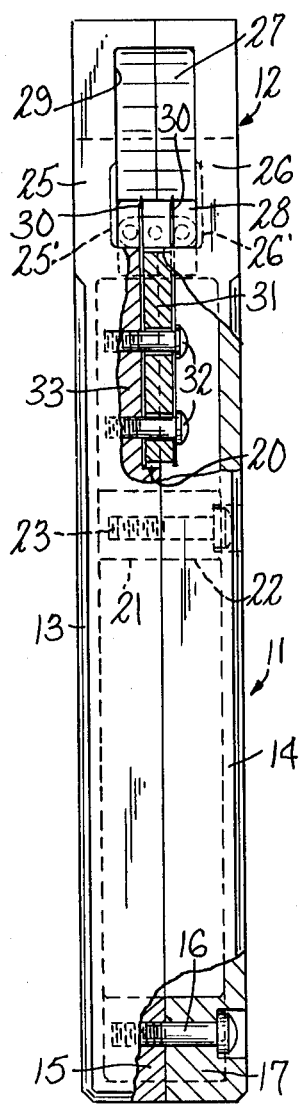
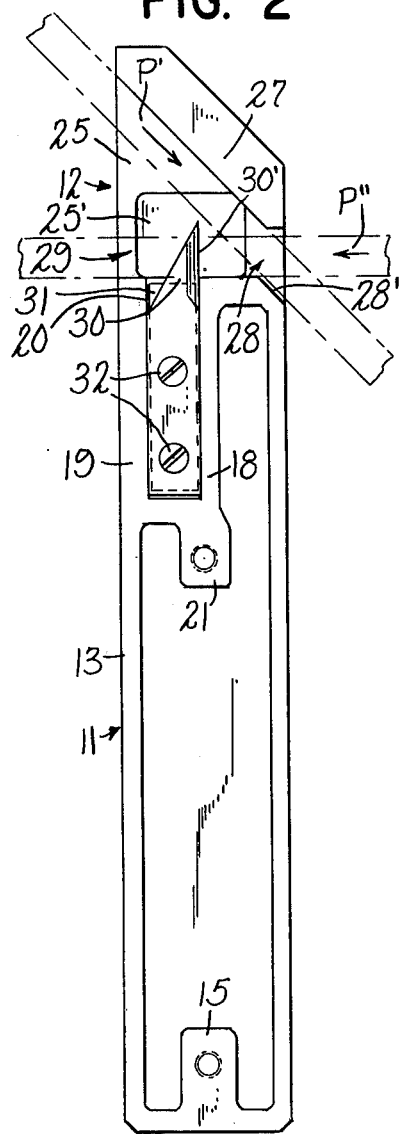
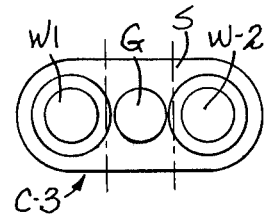
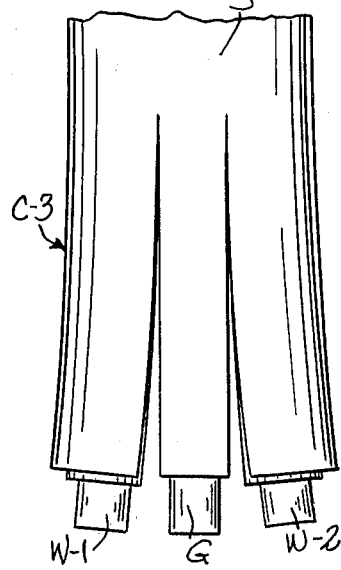
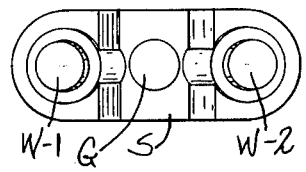
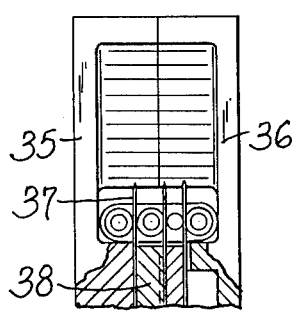
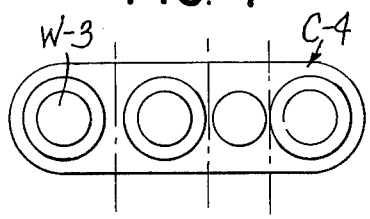

FIG. 8
FIG. 9
FIG. 10
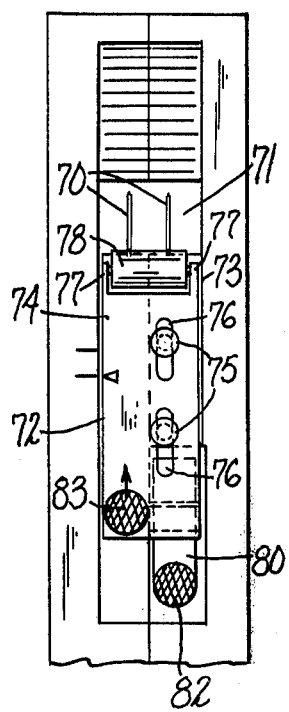
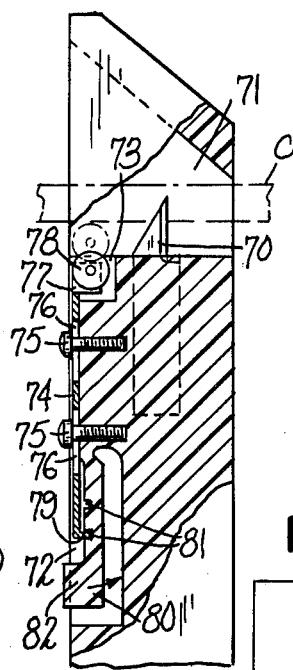
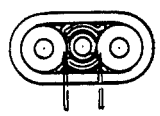
FIG. 11
FIG. 12
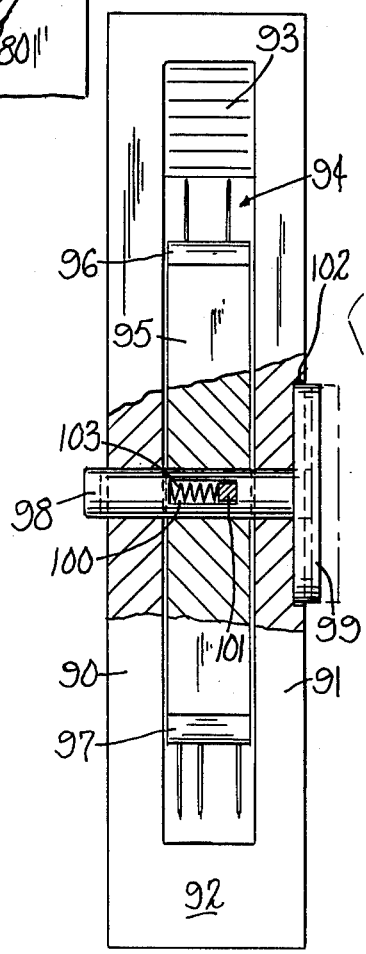
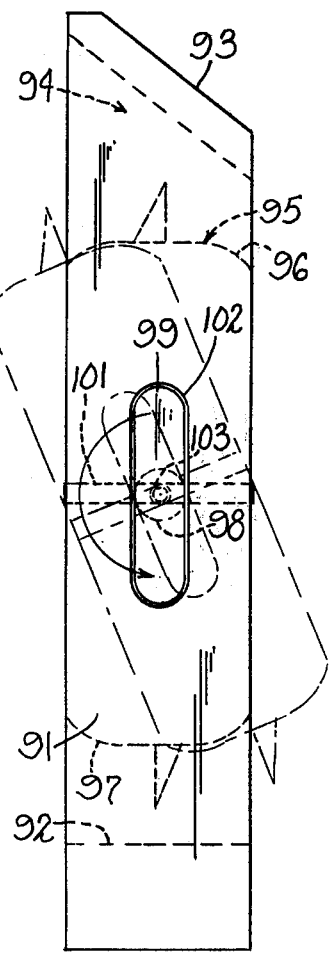

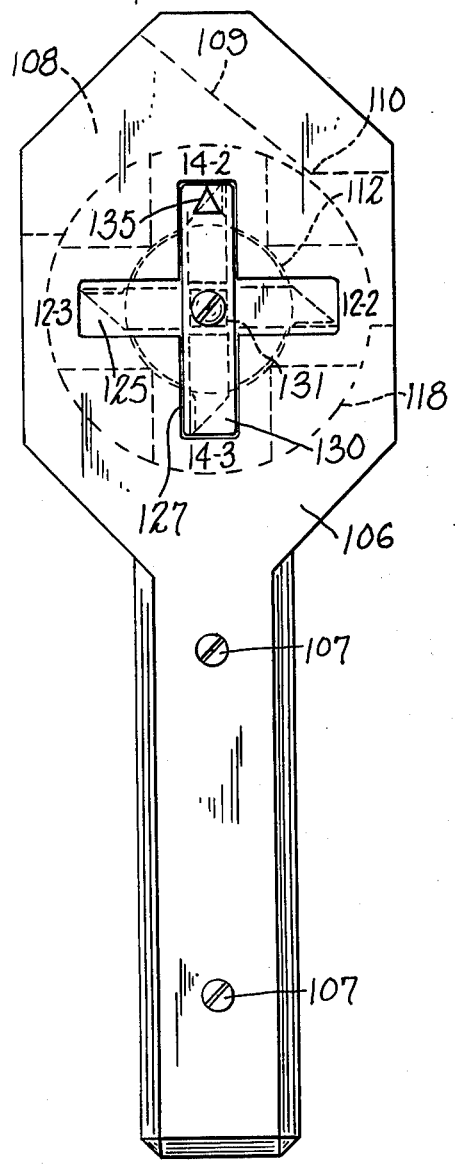
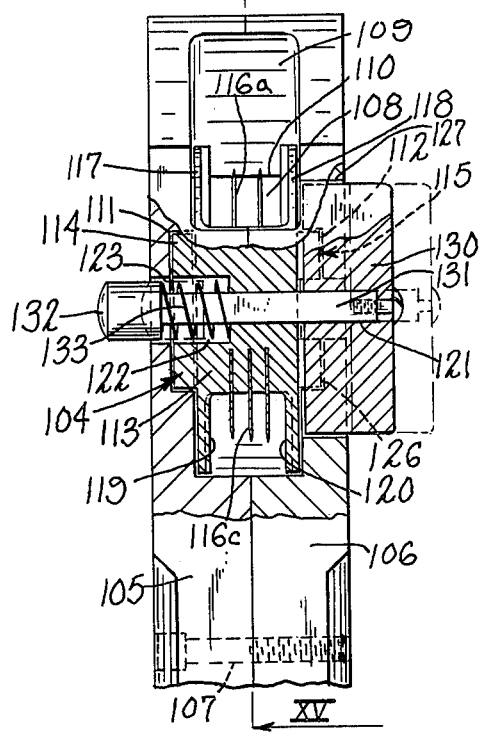
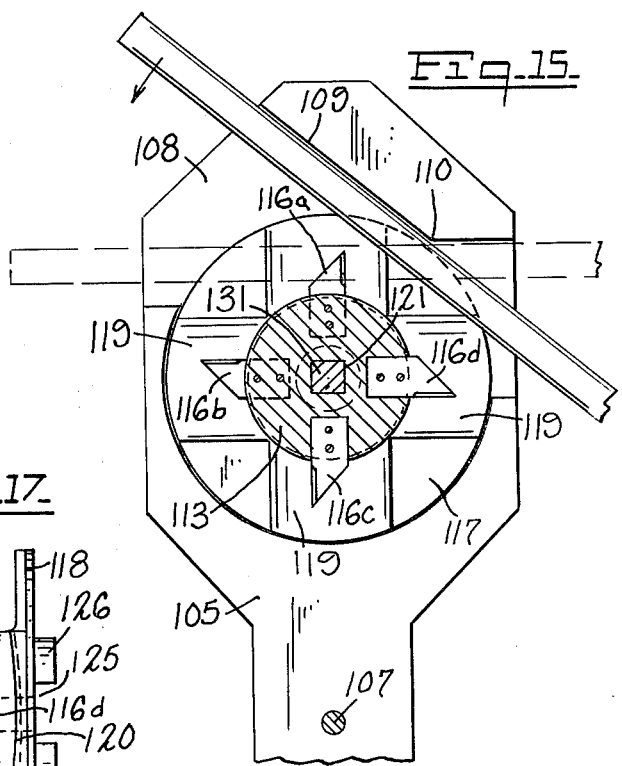
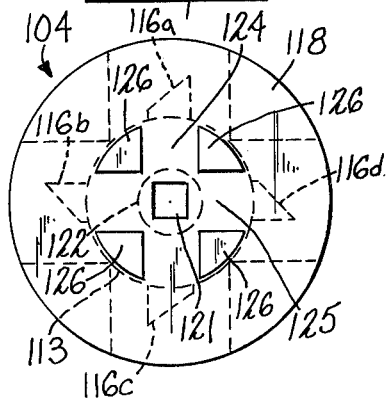
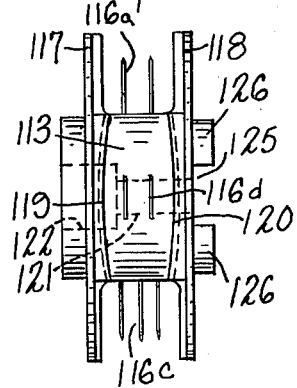

CABLE SPLITTER

This is a continuation-in-part of application Ser. No. 909,124, filed May 24, 1978.

This invention relates to a hand tool for slitting the sheath on flat plastic clad cables (such as UF and NM types) wherein two, three or four similar or different conductors, each individually insulated, are assembled side by side within a single sheath. This tool is designed for easy manipulation to slit the sheath neatly in planes which pass between the individual conductors without impairing the insulation thereof.

Tools heretofore provided for the stated purpose have included movable parts with a cutting blade in one part and a back-up roll or the like in another part so arranged that the cable could be drawn through the tool in a manner to cause the blade to cut the sheath. A plier-type tool of this sort is shown in McMurtrie U.S. Pat. No. 560,524, the cutting blade being a disc with a shart edge. Ayers U.S. Pat. No. 2,589,471 is similar to McMurtrie. Bonito U.S. Pat. No. 2,968,096 and Shannon U.S. Pat. No. 2,943,391 show fixed adjustable blades, Dibble U.S. Pat. No. 3,279,058 and Belling U.S. Pat. No. 3,750,271 use fixed nonadjustable blades. In each prior tool except Belling the arrangement of parts is such that the cutting blade can penetrate only part way through the sheath.

It is accordingly an object of the present invention to provide a simple cable splitting tool wherein the cutting blade can be caused to penetrate completely through the cable sheath as a result of the geometry of the tool, without any back-up means which could be reached by the blade.

It is a further object of the invention to provide a cable splitting tool with a plurality of sets of easily interchangeable cutting blades.

It is another object of the invention to provide a cable splitting tool with means for optionally limiting the blade penetration.

It is a still further object of the invention to provide a cable splitting tool with two or more sets of cutting blades on a support which can be moved to bring a selected set of blades into operative position.

It is yet another object of the invention to provide certain improvements in the form, construction and arrangement of the several parts whereby the above-named and other objects may effectively be attained.

The invention accordingly comprises the features of construction, combinations of elements, and arrangement of parts which will be exemplified in the constructions hereinafter set forth, and the scope of the invention will be indicated in the claims.

Practical embodiments of the invention are shown in the accompanying drawings wherein:

FIG. 1 represents a front elevation of a tool, parts being broken away and in section;

FIG. 2 represents a side elevation of the left hand tool body portion shown in FIG. 1;

FIG. 3 represents an end view of a three-wire cable;

FIG. 4 represents a detail plan view of the cable shown in FIG. 3 after slitting the sheath;

FIG. 5 represents an end view of the cable shown in FIG. 4, after slitting;

FIG. 6 represents a detail front elevation, as in FIG. 1, showing a different set of blades;

FIG. 7 represents an end view of a four-wire cable, adapted to be slit by the blades of FIG. 6;

FIG. 8 represents a detail front elevation of a first modified form of tool with means for varying the depth of cut;

FIG. 9 represents a side elevation of the tool shown in FIG. 8, parts being broken away and in section;

FIG. 10 represents a detail end view of the cable to be cut in the tool of FIGS. 8 and 9, the depth of partial cuts being indicated by broken lines;

FIG. 11 represents a front elevation of a second modified form of tool, with two sets of blades mounted on opposite ends of a turret, parts being broken away and in section;

FIG. 12 represents a side elevation of the tool shown in FIG. 11 with the movement of the turret indicated in broken lines;

FIG. 13 represents a side elevation of a third modified form of tool, with four sets of blades mounted on the cross-arms of a four-way turret;

FIG. 14 represents a detail front elevation of the tool shown in FIG. 13, parts being broken away and parts being in section, two positions of the locking handle being indicated;

FIG. 15 represents a vertical section on the line XV—XV of FIG. 14, two positions of a cable to be slit being indicated;

FIG. 16 represents a detail elevation of the turret flange; and

FIG. 17 represents a detail edge view of the turret shown sectioned in FIG. 14.

Since the present invention relates to a hand tool which could be held in any position without altering its mode of operation, it has been shown, arbitrarily, in a vertical position with the cutting end uppermost and the "front" is assumed to be that face of the tool which will face the operator when a cable is being drawn through the tool toward the operator. The faces adjoining the front are "sides" which are generally similar except as screws in each form have heads only on one side, and the turret control in FIGS. 17 and 18 is on one side.

Referring to the drawings, and particularly FIGS. 1 to 5, the tool body comprises a handle portion 11 and a head portion 12 constituted by the face-to-face fitting together of the complementary body sections 13, 14, each being suitably made of a strong molded plastic. At the bottom, section 13 has an internal block 15 which is threaded to receive a screw 16 passing through the block 17 in the section 14. Toward the upper end of the handle portion the body sections are provided with internal partitions 18, 19 which define a chamber 20 within which the blade assembly is accommodated, and posts 21, 22, like blocks 15 and 17, receive a screw 23 for holding the sections together.

The head portion of the tool comprises spaced parallel side walls 25, 26 connected by the slanting top wall 27 in a position to leave an opening 28 at the rear just large enough to receive freely the largest cable for which the tool is designed. At the front of the tool the opening 29, defined by the side and top walls and the upper front edges of the body sections 13, 14 is vertically elongated, as shown in FIG. 2, so that a cable end passing through the chamber between openings 28 and 29 can assume angular positions varying between 45° and 90° to the longitudinal axis of the tool. The upper rear edges of the sections 13, 14 are shown as being beveled at 28′ to permit the cable end to assume a position adjacent the top wall without bending or binding.

The cutting blade assembly comprises a pair of identical blades 30 and a spacer 31, bored to receive the screws 32 which hold the blades and spacer firmly in place in chamber 20 against the support 33 which is a part of the body section 13. Each blade has a straight body portion and a sharply pointed knife section with a cutting edge 30', and the blades are mounted to project into the chamber between walls 25, 26 by distances greater than the thickness of a flat cable to be slit, with the edges 30' facing rearward toward the opening 28. The chamber walls are preferably recessed as indicated at 25', 26' to allow for the lateral expansion of the cable where it is penetrated by the blades, thus avoiding binding or jamming.

The tool shown in FIGS. 1 and 2 is designed specifically to slit the sheath of the cable C-3, shown in FIGS. 3, 4 and 5, which cable has two insulated conductors W-1 and W-2 and a non-insulated ground G in the middle, all enclosed within a sheath S, generally of plastic material. The spacing of the blades 30 is such that they can cut entirely through the sheath along lines each side of the ground (e.g., vertical broken lines in FIG. 3) with little or no effect on the insulation of the conductors. This cutting is effected by inserting a cable end into the tool on the angular path P' to a desired distance, when causing the cable and tool to assume the perpendicular relation indicated at P", with the sharp blade points penetrating the sheath, and pulling the cable outward as the blade edges sever the sheath from the point of penetration to the end of the cable. The upper edge of the opening 28, which may be flattened slightly, as shown in FIG. 2, forces the cable to stay aligned with the blade edges throughout the cutting operation except for a final short distance, and the cable has no tendency to slip off the blade because the cutting edge is perpendicular to the line of movement of the cable. The slit cable end is shown in FIGS. 4 and 5, the insulation being in condition for circumcision and removal as needed.

For use on a four-conductor cable C-4 (FIGS. 6 and 7) having an additional insulated conductor W-3, the tool is made with a slightly wider space between the side walls 35, 36 and a third blade 37 is added, with a second spacer 38 in order to effect the slitting indicated by broken lines in FIG. 7.

It is sometimes necessary to make incisions in a cable sheath which are not complete slits, in order to gain access to the conductors in a cable from only one side. In the first modified form of tool, shown in FIGS. 8 and 9, the blades 70 may be mounted fixedly, as in FIGS. 1 and 2, to project into the cutting chamber 71 sufficiently to slit completely a three-conductor cable such as C-3, FIG. 3. The front face of the tool is provided with an elongated recess 72 connecting upwardly with the socket 73 at the lower front edge of the chamber 71. A flat slide 74 is held in the recess 72 by screws 75 which pass through slots 76, the upper end of the slide having ears 77 which project into the socket and support the axle of a small roller 78. At its lower end the slide has an inwardly turned ridge 79 and the face of the tool is additionally cut away to make room for a resilient latch strip 80 having two grooves 81, adapted to be engaged by the ridge 79. A push button 82 is used to depress the latch strip and a push button 83 on the slide facilitates moving the slide between roller retracted position (full lines) and roller extended position (broken lines in FIG. 9). In the latter position, a cable C is lifted off the bottom of the cutting chamber to a position such that the blade point can penetrate only about half-way through the cable (broken lines in FIG. 10); in its retracted position the roller permits the cable to be fully penetrated.

As a second modified form of tool, two-blade and three-blade units may be mounted in opposite ends of an elongated turret as shown in FIGS. 11 and 12. In this tool, the tool body comprises flat side walls 90, 91, joined at their base by a solid block 92 and at their upper ends by the slanting top wall 93, forming the top and sides of a cutting chamber 94, similar to the chambers 29 and 71. The elongated turret 95 has square or slightly rounded ends 96, 97 in which are mounted blade units having, respectively, two blades and three blades. The blades may be molded directly into the turret or removably held therein, by means not shown. The turret axle is constituted by the stem 98 of an elongated key 99, the stem being traversed by a slot 100 through which passes the square pin 101, press fitted through a hole in the turret. The surface of the side 91 is recessed at 102 in a form to receive the key and the key is biased toward the recess by the compression spring 103 between the pin 101 and an end of the slot 100. The stem 98 projects from the surface of the side 90 sufficiently to serve as a push button for releasing the key from its recess (broken lines in FIG. 11) so that the turret can be turned (broken lines in FIG. 12) to bring a different set of blades into cutting position. The turret may suitably be made of complementary halves, screwed, keyed or cemented together, for convenience in assembly.

In the third modified form, FIGS. 13 to 17, the turret 104 is augmented to carry four sets of blades instead of two and the locking arrangement has improved strength and rigidity. The tool handle and head are conveniently made of matching halves 105, 106, as in FIGS. 1 to 5, the halves being screwed together by screws 107. The head portion has a cutting chamber 108 with parallel side walls and a slanting top wall 109 (like the wall 27) the rear edge 110 of which determines the position of the cable during the cutting operation.

The side walls are recessed at 111 and 112 to provide bearings for the ends 114, 115 of the hub 113 of the turret, which is spool shaped (FIGS. 16 and 17) with circular flanges 117, 118, each of which is preferably somewhat variable in thickness, for a reason explained below. Spaced at 90° intervals around the middle portion of the hub are sets of slitting blades, 116a, 116b, 116c and 116d, shown as comprising two sets of two blades each and two sets of three blades each, adapted to slit cables having either three or four wires and being of different standard dimensions. The hub flanges have inwardly facing surfaces 119, 120 which are slightly concave opposite each set of blades, as shown in FIG. 17, to allow for the additional width of the cable in the area where the blades project through the cable and thus separate slightly the wires therein.

The hub is traversed axially by a square bore 121 which communicates with a cylindrical chamber 122 in the hub end 114 in register with the opening 123 in the wall of the portion 103. The opposite end 115 of the hub is divided by perpendicularly disposed diametrical channels 124, 125 to leave only the four quadrants 126, the outer arcuate walls of which fit in the recess 112. The wall of the portion 105 is provided with an X-shaped opening 127 each arm of which has a width corresponding substantially to that of the channels 124, 125.

Adjustment of the hub to each of its four operative positions is effected and controlled by the key 130, non-rotatably fixed on one end of a square pin 131 which fits slidably in the square bore 121 with its opposite end fixed in a push button 132, dimensioned to move freely through the opening 123 into and out of the chamber 122. A spring 133 in the chamber biases the push button outward and thus pulls the key toward the hub. The key is rectangular and is designed to fit snugly within either aligned pair of arms constituting the opening 127. When fully seated, by the pull of the spring 133, the key also fits within one of the channels 124 or 125, according to its orientation in relation to the hub, and thus serves to lock the hub securely against rotation. Adjustment to a different position, to bring a different set of blades 116 into operative position in the chamber 108, is effected by pushing in the push button 132 which frees the key from the opening 127 (broken lines in FIG. 14) so that the hub can be rotated 90° or 180° in either direction. When the desired set of blades is in place, the push button is released and the key drops into the opening 127 and again into the channel 124 or 125. The surface of the tool head may be marked with such designation as 12-2, 14-2, 12-3, 14-3 (FIG. 1) opposite each arm of the opening 127 and one end of this key may have a pointer 135 so that, by suitable coordination, the pointer can indicate which set of blades is in cutting position.

The operation of this tool can be readily understood from the foregoing and from inspection of FIG. 15 wherein the cable to be slit is shown in full line as introduced across the upper portion of the chamber 108 adjacent the top wall 109 thereof. For the slitting operation the relative angle of the tool and cable is changed to impale the cable insulation on the upwardly directed blades, as shown in broken lines, and the cable is drawn through the tool in the direction of the arrow on the cable.

It will be recognized that, in each tool disclosed, the cutting chamber has an angularly disposed upper wall to provide a small opening at one end and a large opening at the opposite end, with a clear path parallel to the top wall for inserting a cable end past the point of the blades or blades and a cutting path defined at one end by the top of the small opening, wherein the cable is caused positively to be impaled on the blade and slit thereby.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What I claim is:

1. A cable splitting tool (according to claim 2 wherein) comprising an elongated handle portion and a hollow head portion at one end of the handle portion, the head portion including spaced parallel internal side walls and an internal top having a rear edge, said walls defining a cutting chamber, at least one pointed slitting blade extending into said chamber from the direction of the handle portion, the top wall of the chamber being so disposed that its rear edge defines the upper limit of a lateral opening, said edge lying substantially in a plane which passes through the blade point and is perpendicular to the length of the handle, the angle of the top wall relative to said plane being such that no point on the top wall surface is spaced from the point of the splitting blade by less than the thickness of a cable to be slit, the tool including a plurality of blades and means for mounting said blades in a predetermined position in the handle portion, and the blade mounting means (is) being an elongated turret pivotally mounted in the handle and provided with blades at each end.

2. A cable splitting tool according to claim 1 wherein there are more blades on one end than on the other.

3. A cable splitting tool (according to claim 1 which includes) comprising an elongated handle portion and a hollow head portion at one end of the handle portion, the head portion including spaced parallel internal side walls and an internal top having a rear edge, said walls defining a cutting chamber, at least one pointed slitting blade extending into said chamber from the direction of the handle portion, the top wall of the chamber being so disposed that its rear edge defines the upper limit of a lateral opening, said edge lying substantially in a plane which passes through the blade point and is perpendicular to the length of the handle, the angle of the top wall relative to said plane being such that no point on the top wall surface is spaced from the point of the slitting blade by less than the thickness of a cable to be slit, the tool including a rotatable turret having a hub portion journaled in said side walls of the cutting chamber, the turret being provided with a plurality of sets of pointed slitting blades projecting radially from said hub portion and being movable selectively into cutting positions, means for locking the turret in different selected positions and means for releasing said locking means.

4. A cable splitting tool according to claim 3 wherein the turret is provided with four sets of slitting blades spaced at 90° intervals around the hub.

5. A cable splitting tool according to claim 3 or 4 wherein the head portion is provided with a plurality of lateral slots in a side wall equal to the number of sets of blades, the turret is provided with an axially movable key, the hub is provided with means engageable with the key, and the key is engageable selectively with each slot and with said last named means to lock a selected set of blades in cutting position.

6. A cable splitting tool according to claim 5 which includes axially movable means associated with the turret for moving the key to a release position and means biasing the key toward locking position.

* * * * *

UNITED STATES PATENT AND TRADEMARK OFFICE
CERTIFICATE OF CORRECTION

PATENT NO. : 4,265,016
DATED : May 5, 1981
INVENTOR(S) : LUCIEN C. DUCRET

It is certified that error appears in the above-identified patent and that said Letters Patent are hereby corrected as shown below:

Column 3, line 23 - "when" should be "then"

Column 6, line 9 - "splitting" should be "slitting"

Signed and Sealed this

Twenty-first Day of July 1981

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,265,016
DATED : May 5, 1981
INVENTOR(S) : LUCIEN C. DUCRET

It is certified that error appears in the above–identified patent and that said Letters Patent are hereby corrected as shown below:

Column 5, lines 52-53 "(according to claim 2 wherein)" should be deleted.

Column 6, line 13 "(is)" should be deleted.

Column 6, lines 18-19 "(according to claim 1 which includes)" should be deleted.

Signed and Sealed this

Eighth Day of December 1981

[SEAL]

Attest:

Attesting Officer

GERALD J. MOSSINGHOFF
Commissioner of Patents and Trademarks